(12) United States Patent
Caldwell

(10) Patent No.: US 10,301,202 B2
(45) Date of Patent: May 28, 2019

(54) SYSTEM AND METHOD FOR AERATION BY AIR INFUSION

(71) Applicant: Airmaster Aerator L.L.C, Wisner, LA (US)

(72) Inventor: Dean A. Caldwell, DeRidder, LA (US)

(73) Assignee: Airmaster Aerator L.L.C., Wisner, LA (US)

( * ) Notice: Subject to any disclaimer, the term of this patent is extended or adjusted under 35 U.S.C. 154(b) by 217 days.

(21) Appl. No.: 15/148,917

(22) Filed: May 6, 2016

(65) Prior Publication Data
US 2017/0321702 A1   Nov. 9, 2017

(51) Int. Cl.
*C02F 3/22* (2006.01)
*F04D 17/16* (2006.01)
*F04D 29/60* (2006.01)

(52) U.S. Cl.
CPC ............. *C02F 3/22* (2013.01); *F04D 17/16* (2013.01); *F04D 29/601* (2013.01); *C02F 2301/026* (2013.01); *Y02W 10/15* (2015.05)

(58) Field of Classification Search
CPC ............. B01F 3/0446; B01F 3/04517; B01F 2005/0017; C02F 3/16; C02F 3/18; C02F 3/22; C02F 2301/026; F04D 7/00; F04D 13/02; F04D 29/52; F04D 29/54; F04D 31/00; F04D 17/16; F04D 29/601; Y02W 10/15
USPC ........................................ 261/28, 29, 84, 120
See application file for complete search history.

(56) References Cited

U.S. PATENT DOCUMENTS

| | | | | |
|---|---|---|---|---|
| 4,193,951 A | * | 3/1980 | Stanley | B01F 3/04773 210/242.2 |
| 4,441,452 A | * | 4/1984 | Strain, Jr. | A01K 63/042 119/215 |
| 4,443,338 A | * | 4/1984 | Reid | C02F 3/1257 210/194 |
| 5,707,562 A | * | 1/1998 | Karliner | B01F 3/04021 261/120 |
| 6,325,842 B1 | * | 12/2001 | Caldwell | B01F 3/0473 210/242.2 |
| 8,011,642 B2 | * | 9/2011 | Tsai | B01F 3/04588 210/242.2 |
| 2004/0055960 A1 | * | 3/2004 | McNeill | B01F 3/04773 210/721 |
| 2013/0292858 A1 | * | 11/2013 | Keeton, Jr. | B01F 13/1025 261/120 |

* cited by examiner

*Primary Examiner* — Charles S Bushey

(57) ABSTRACT

An air infusion aeration system includes a submersible downdraft tube that carries fluid from its inlet opening to the outlet opening vertically above the inlet opening. The system includes an impeller coupled to the outlet opening and configured to: draw fluid into the inlet opening and provide the drawn fluid into a discharge pressure manifold (DPM) as a fluid stream. The system includes a turbo blower that injects air into the DPM, and the DPM, which includes a center portion and a smaller diameter end portion at opposite ends of the center portion. The DPM is configured to: reduce pressure of the fluid stream at a center of the DPM; within the end portions, receive the air injection into the pressure-reduced fluid stream thereby infusing the injected air into the fluid steam; and forcibly discharge the air-infused fluid stream down toward the body of fluid.

15 Claims, 10 Drawing Sheets

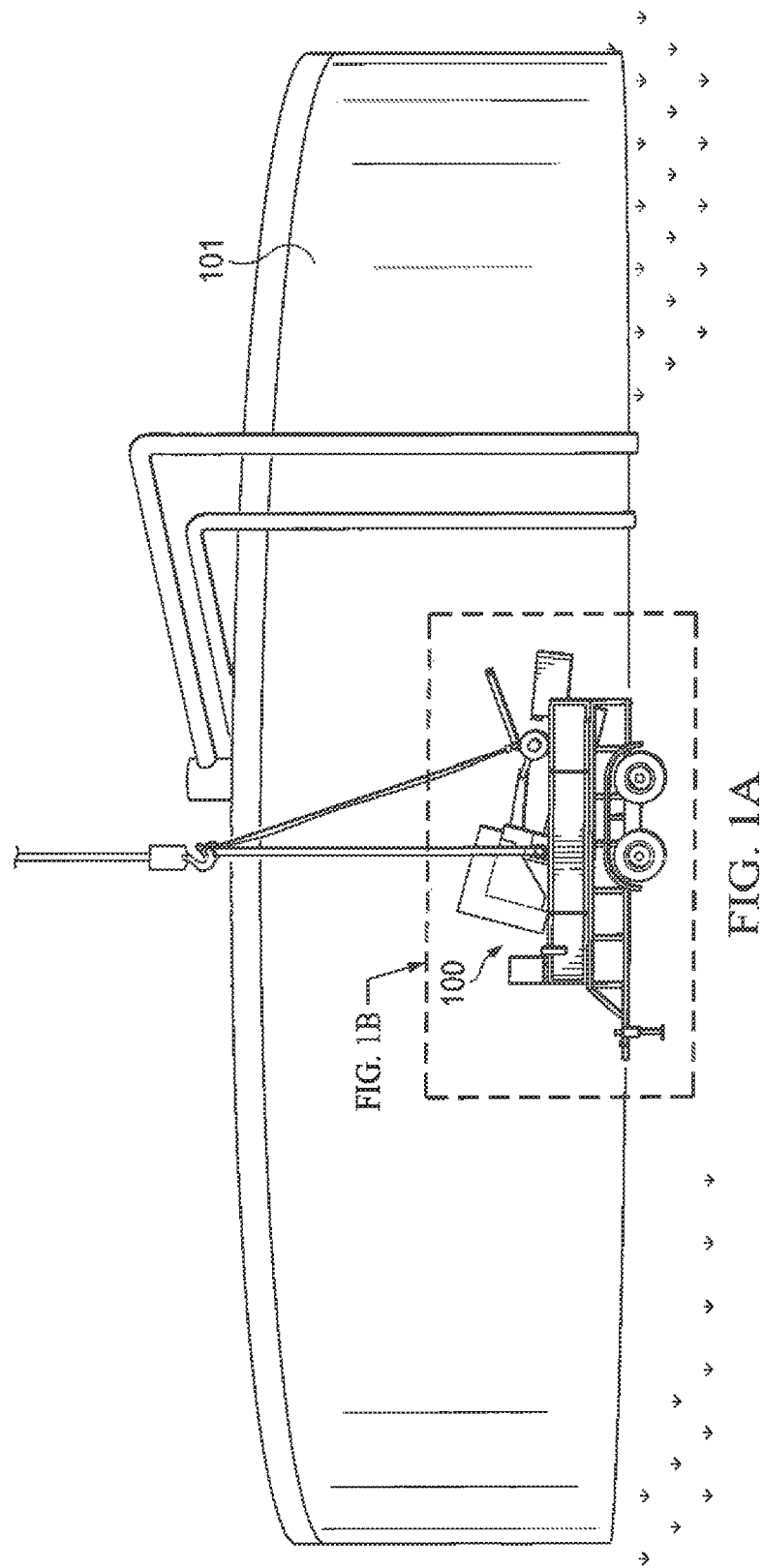

SYSTEM AND METHOD FOR AERATION BY AIR INFUSION

TECHNICAL FIELD

The present disclosure generally relates to aeration of fluids and more particularly to a system and method for air infusion in an aeration system.

BACKGROUND OF THE DISCLOSURE

Bodies of water, such as ponds, basins, reservoirs, and lagoons are used to treat waste. Aerobic and anaerobic activities of certain bacteria is one way of treating waste. However, the byproducts of certain anaerobic bacteria give off unpleasant odors. Aerobic bacteria produce carbon dioxide as a byproduct, which does not produce such noxious odors. At times, the oxygen content of the water is insufficient to support the bacterial activity. Aeration increases the amount of oxygen in the wastewater. Certain methods of aeration, such as air diffusion, produce bubbles at the surface of the aerated body of water.

SUMMARY OF THE DISCLOSURE

To address one or more of the above-deficiencies of the prior art, various disclosed embodiments described in this disclosure provide an improved apparatus for and method of aerating a body of fluid, such as a waste water treatment tank. This apparatus is configured to be used in water treatment, wastewater treatment, industrial applications, aquaculture, and agricultural applications. This apparatus is configured to raise the dissolved oxygen level of the water, and to achieve high capacity water movement.

A system for aerating a body of fluid that includes water is provided. The system includes a downdraft tube including an inlet opening and an outlet opening vertically above the inlet opening; the downdraft tube configured to submerge below a surface of the body of fluid and carry fluid from inlet opening to the outlet opening. The system includes a water pump impeller coupled to the outlet opening and configured to draw fluid into the inlet opening and provide the drawn fluid into a discharge pressure manifold as a fluid stream. The system includes a turbo blower configured to inject air into the discharge pressure manifold. The system includes the discharge pressure manifold coupled to the turbo blower and including a center portion and an end portion at opposite ends of the center portion. The center portion has a larger diameter than the end portions. The discharge pressure manifold is configured to: reduce pressure of the fluid stream at a center of the discharge pressure manifold. The discharge pressure manifold is configured to, within the end portions, receive the air injection into the pressure-reduced fluid stream thereby infusing the injected air into the fluid steam. The discharge pressure manifold is configured to forcibly discharge the air-infused fluid stream down toward the body of fluid.

An apparatus for aerating a body of fluid that includes water is provided. The apparatus includes a motor configured to drive a water pump impeller and a turbo blower via a single shaft. The apparatus includes a downdraft tube including an inlet opening and an outlet opening vertically above the inlet opening. The downdraft tube is configured to submerge below a surface of the body of fluid and carry fluid from inlet opening to the outlet opening. The apparatus includes the water pump impeller coupled to the outlet opening and configured to draw fluid into the inlet opening and provide the drawn fluid into a discharge pressure manifold as a fluid stream. The apparatus includes the turbo blower configured to inject air into the discharge pressure manifold. The apparatus includes the discharge pressure manifold coupled to the turbo blower and including a center portion and an end portion at opposite ends of the center portion. The center portion has a larger diameter than the end portions. The discharge pressure manifold is configured to: reduce pressure of the fluid stream at a center of the discharge pressure manifold. The discharge pressure manifold is configured to: within the end portions, receive the air injection into the pressure-reduced fluid stream thereby infusing the injected air into the fluid steam. The discharge pressure manifold is configured to: forcibly discharge the air-infused fluid stream down toward the body of fluid.

A method for aerating a body of fluid that includes water is provided. The method is performed by an air-infusion aeration system that includes a downdraft tube submerged below a surface of the body of fluid, wherein the downdraft tube includes an inlet opening and an outlet opening vertically above the inlet opening. The method includes: drawing, by a water pump impeller coupled to the outlet opening, fluid into the inlet opening. The method includes: carrying, by the downdraft tube, the drawn fluid from inlet opening to the outlet opening. The method includes: providing, by the water pump impeller, the drawn fluid into a discharge pressure manifold as a fluid stream. The method includes: injecting, by a turbo blower, air into the discharge pressure manifold. The discharge pressure manifold is coupled to the turbo blower. The discharge pressure manifold includes a center portion and an end portion at opposite ends of the center portion. The center portion has a larger diameter than the end portions. The method includes: reducing, by the discharge pressure manifold, pressure of the fluid stream at a center of the discharge pressure manifold. The method includes: within the end portions, receiving the air injection into the pressure-reduced fluid stream thereby infusing the injected air into the fluid steam. The method includes: forcibly discharging, by the discharge pressure manifold, the air-infused fluid stream down toward the body of fluid.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller might be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A; B; C; A and B; A and C; B and C; and A and B and C. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 1A and 1B illustrate an air infusion aeration system and waste water treatment tank according to embodiments of the present disclosure;

DETAILED DESCRIPTION

FIGS. 1A through 10, described below, and the various embodiments used to describe the principles of the present disclosure are by way of illustration only and should not be construed in any way to limit the scope of the disclosure. The drawings are not necessarily drawn to scale. The numerous innovative teachings of the present application will be described with reference to exemplary non-limiting embodiments. It should be understood at the outset that, although example embodiments are illustrated below, the present invention may be implemented using any number of techniques, whether currently known or not. The present invention should in no way be limited to the example implementations, drawings, and techniques illustrated below.

Figure 1B:
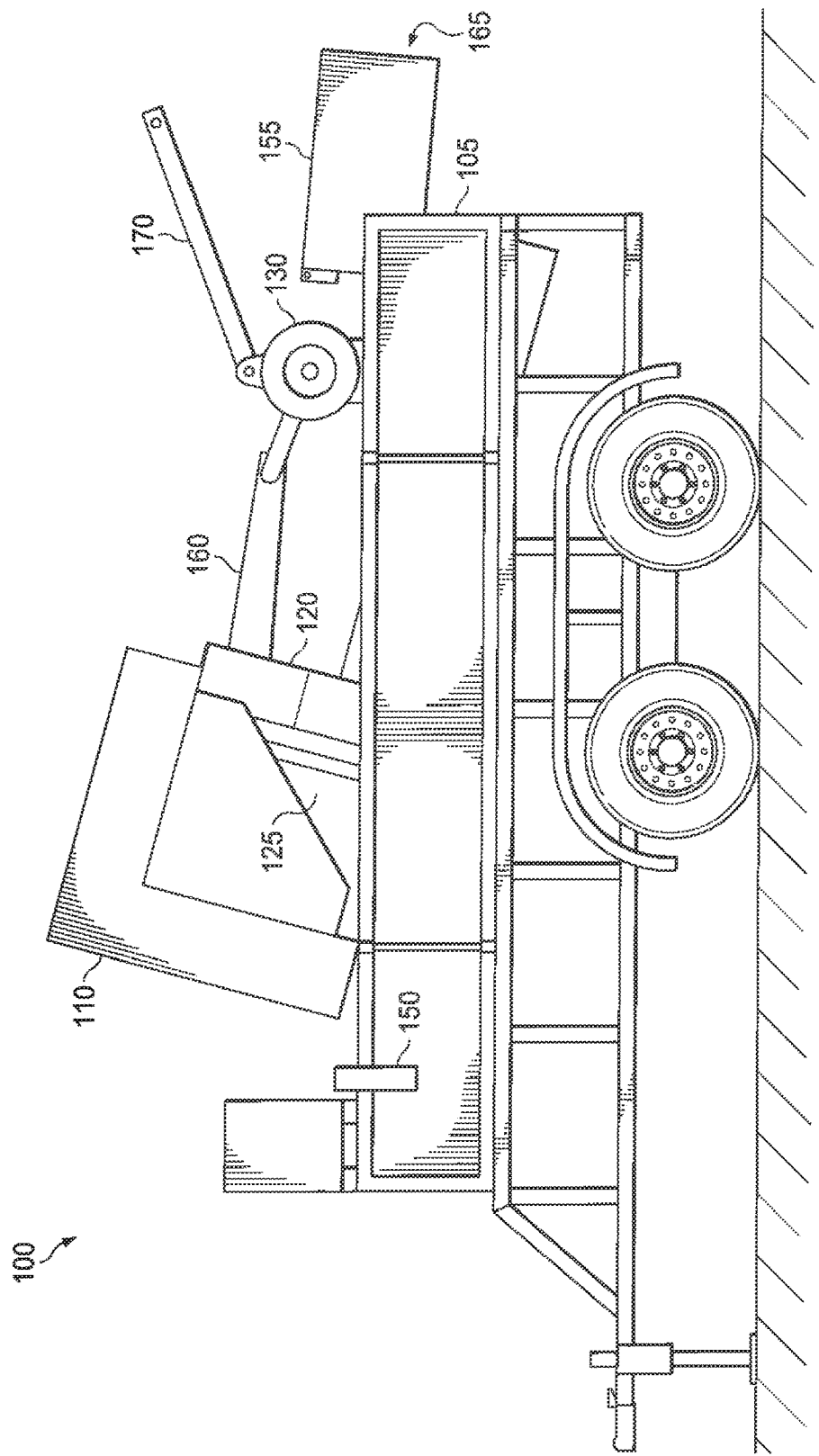

FIGS. 1A and 1B illustrate an air infusion aeration system 100 and waste water treatment tank 101 according to embodiments of the present disclosure. The aeration system 100 is configured to provide aeration to a body of fluid, such as a body of water. Examples of bodies of water include tanks (such as the tank 101), ponds, lagoons, basins, reservoirs, and the like. Although certain details will be provided with reference to the components of the aeration system 100, it should be understood that other embodiments may include more, less, or different components.

In the example shown in FIG. 1A, the tank 101 is built on top of the ground. However, other tanks could be partially or wholly subsurface. The tank 101 can have a height that is several feet high. For example, the tank 101 could have walls that extend 20 feet above ground and that hold a body of fluid that has a height spanning 14 feet from the bottom of the tank to the top surface of the body of wastewater fluid. As an example, the tank 101 includes walls that divide the tank 101 into separate compartments, such as an anoxic compartment and an aeration compartment. In the anoxic compartment, oxygen is not added to the wastewater, and the wastewater undergoes an ammonia and nitrogen removal process. In an illustrative example, the compartment in which the aeration system 100 is installed contains approximately 138,000 gallons of wastewater fluid. An aeration system 100 can be installed in each compartment of the tank 101. In addition to the air infusion aeration system 100, the tank 101 can include a different type aeration system, such as an air diffusion aeration system. The diffusion aeration system includes various pipes that input air to the body of fluid in the tank from the bottom of the tank.

The aeration system 100 includes one or more floats 105, a motor 110, a pump shaft 115 (shown in FIG. 5), a turbo blower 120 at a first end of the aeration system; an air pump 125, a discharge pressure manifold 130 at a second end of the aeration system. The aeration system 100 includes a submersible water pump 140 (described in detail with respect to in FIGS. 2 and 5) that includes a water pump impeller (such as the impeller 405 shown in FIG. 4). The aeration system 100 includes a frame 150 that provides structural support and stability for the aeration system 100 and the components of the aeration system and also secures or supports non-submersible components above the surface of the body of fluid. The frame 150 includes a one or a combination of support beams, support plates, trusses, and mounting supports. The aeration system 100 includes a downdraft tube 155 that increases the vertical and horizontal mixing capability of the aeration system 100.

In certain embodiments, the aeration system 100 includes two floats 105 (or pontoons), one on each side of the aeration system 100 and along the length of opposite sides of the aeration system 100. The floats are configured to maintain the non-submersible components of the aerator system 100 above the surface of the body of water. The floats 105 comprise an expanded polystyrene core with a hybrid urethane coating. The coating of the float is impervious to diluted acids, alkalis and petroleum products. In certain embodiments, each float 105 is sheltered by a shell 170, such as a 304-L stainless steel expanded metal shell. In certain embodiments, a support beam holds the floats together. The shell 170 can support the weight of at least two 240 pound service technicians, while the aeration system remains afloat. In certain embodiments, the length of the shell substantially extends the length of the aeration system.

The motor 110 drives the pump shaft 115. The power of the motor 110 can be in the range of ten to fifty horsepower. A toothed, drive system powers the single pump shaft 115 that drives the turbo blower 120 and the water pump impeller. During operation, the motor rotates the pump shaft 115, causing the impeller, which is connected to the pump shaft 115, to rotate rapidly. The rapidly-turning impeller pulls water up vertically through the downdraft tube 155. Water is drawn from below the surface of the body of water, through an inlet opening at the bottom of the downdraft tube 155, up into the impeller. The drawn in water is pressurized. That is, a water pressure of the drawn in water is increased by the impeller and fed into the discharge pressure manifold 130. In certain embodiments, the drive system does not include a gearbox.

In certain embodiments, a motor hood covers the motor 110. The motor hood is composed of 304-L stainless steel. The motor hood covers the motor, the drive belt, and maintenance-free pillow-block bearings. The motor hood is hinged to protect the motor 110 from direct exposure to the sun, precipitation, and water spray.

The downdraft tube 155 is a tube that extends vertically downward from the water pump to a depth, such as several feet below the surface of the body of fluid in the tank 101. The downdraft tube 155 can be a hollow tube of any suitable shape that includes solid walls and an open at each of its ends, including an inlet opening 165 and an outlet opening. The inlet opening of the downdraft tube 155 allows wastewater in the tank 101 to enter the downdraft tube 155. The outlet opening of the downdraft tube 155 outputs wastewater from the downdraft tube 155 into the water pump, which expels the pumped water through an opening in the discharge pressure manifold 130 for receiving wastewater from the water pump, pressurizing the drawn in water within the center portion of the discharge pipe. The downdraft tube 155 could be a single piece pipe. In other embodiments, the downdraft tube 155 is a multi-piece pipe, formed from pipe members that fit to each other to connect with each other. For example, the downdraft tube 155 can be a rectangular hollow tube including an upper member and a lower member that connects to the upper member so as to prevent fluid that is inside the downdraft tube 155 from escaping through the connection point. The connection point can be where the lower member slidably fits inside the upper member to attach to the upper member. Alternatively, the connection point can be where the lower member is fastened to the upper member, such as by using mechanical fasteners. The upper member of the downdraft tube 155 includes the outlet opening, which can be specifically dimensioned, or otherwise configured to connect to the water pump, such as by attaching to a frame around the water pump impeller. In certain embodiments, the upper member can have a length in the range of two to three feet. In certain embodiments, the lower member can have a length in the range of five to eight feet, such that when attached to the upper member, the downdraft tube 155 has a length in the range of eight to ten feet. The bottom of the lower member of the downdraft tube 155 is the inlet opening 165 through which wastewater enters the aeration system 100. The suction of the water pump 140 not only draws wastewater disposed at the same level as inlet opening 165, but also is powerful enough to draw wastewater from several feet below the inlet opening 165. In a particular example, length of the downdraft tube 155 is eight feet, which enables the water pump to draw wastewater at least six feet below the inlet opening 165, which would include drawing wastewater from the bottom of the tank 101 (i.e., holding wastewater spanning 14 feet deep).

In certain embodiments, the water pump 140 pumps approximately five million gallons of fluid per day, which is more than three-thousand gallons of fluid per minute. In certain embodiments, the water pump 140 pumps in a range of approximately five million to twelve million gallons of fluid per day, which is a range of more than three-thousand to eight-thousand gallons of fluid per minute. In a particular example, the water pump 140 enables the aeration system 100 to infuse the air into the one hundred thirty-eight thousand gallons of wastewater contained in the tank 101 approximately thirty-eight times per day. In order to output an air-water mixture, the amount of head pressure that the water pump 140 overcomes is the head pressure corresponding to the vertical distance (e.g., approximately two feet depth of wastewater) spanning from the surface of the body of fluid to the top of the center portion of the discharge pressure manifold 130. By way of comparison, in a diffusion type aeration system, in order to output an air-water mixture, the head pressure that must be overcome corresponds to the vertical distance spanning from the surface of the body of fluid to the bottom of the tank 101 (e.g., fourteen feet depth of wastewater), where air blowers output air for diffusion. By way of comparison to a diffusion aeration system, the aeration system 100 uses less horsepower, thus consumes less electricity, as a result of this reduction in the amount of head pressure to overcome.

The turbo blower 120 injects air into the wastewater stream. A pipe assembly 160 carries the oxygenated air mix from the turbo blower 120 to the discharge pressure manifold 130. The air from the pipe assembly 160 permeates the wastewater in the discharge pressure manifold 130, which forcibly discharges the wastewater out of the exits of the discharge pressure manifold 130. In certain embodiments, the diameter of the pipe assembly 160 is between two and three inches. The pipe assembly 160 includes an inlet that receives the oxygenated air mix from the turbo blower 120, and a tee split ending in two outlets. On opposite sides of the tee split, the pipe assembly 160 includes two outlets that eject the oxygenated air mix into different halves of the discharge pressure manifold 130. That is, the pipe assembly 160 tapers to the tee split that redirects the air into an air distribution tube (see reference number 520 described in detail with respect to FIG. 5) through each half of the discharge pressure manifold 130.

The discharge pressure manifold 130 includes a large discharge pipe. The discharge pipe includes a center portion extending approximately the outer width between the floats 105. The discharge pipe includes two end portions, each end portion extending out from an opposite end of the center portion. The diameter of the center portion is larger than the diameter of the diameter of the end portions. For example, in certain embodiments, the center portion of the discharge pipe includes a diameter that ranges from ten to sixteen inches, and the reduced diameter end portions of the discharge pipe includes a diameter that ranges from exit to ten inches. Compared with the diameter of the center portion, the exit of the discharge pressure manifold 130 through the end portion is reduced to increase the velocity at the exit and to reduce pressure at the exit. The walls of the discharge pipe a solid such that water does not spray out through the walls. That is, each end portion forcibly discharges a portion of the wastewater, such as a one-half portion of the wastewater within the discharge pressure manifold 130. In certain embodiments, the discharge pipe comprises 304-L stainless steel.

In certain embodiments, the exits of the discharge pipe include vanes (such as, spiral vanes) to induce a vortex into the exiting water, further reducing the pressure at the center of the discharge pipe. The vortex creates negative pressure zones. The negative pressure zones increase the amount of air that can be injected into the spiraling wastewater. The negative pressure zone significantly lowers the head from the turbo blower 120 and significantly increases the amount of air the turbo blower 120 can infuse into the wastewater within the discharge pressure manifold 130. The vanes are disposed interiorly within the hollow channel of the discharge pipe. In certain embodiments, the discharge pressure manifold 130 includes a first spiral vane and a second spiral vane, each extending from a location proximate to an opening through which the discharge pressure manifold 130 receives wastewater from the water pump. Each of the first and second spiral vanes extend in opposite longitudinal directions (such as right and left) of the discharge pipe to opposite exits of respective end portions of the discharge pipe. The spiraling vanes provide structural support to the portion of the pipe assembly 160 that is disposed interiorly within the hollow channel of the discharge pipe. That is, spiraling vanes limit movement of the portion of the pipe assembly 160 that is disposed interiorly within the hollow channel of the discharge pipe, which is movement that may result from impact by the spiraling wastewater. The discharge of the wastewater at the two sides of the discharge manifold creates a zone of high shear and increases the air velocity at the surface of the water droplets discharged from the aeration system 100. The zone of high shear disrupts the composition of the wastewater and infuses the air into the wastewater. That is, the aeration system 100 is a surface aerator that infuses air into the wastewater. At the exit, this zone of high shear creates a non-equilibrium flash point process that can remove nitrogen and ammonia from the wastewater.

In certain embodiments, a spiraling vane includes a flat metal bar, which can be approximately two inches wide. A first end of the flat metal bar can be affixed to (such as welded together with) the air distribution tube 520a that is internally within the center portion of the discharge pressure manifold 130. The second end of the flat metal bar can be affixed to the air distribution tube 520a at a different affixation point. Between the two ends of the flat metal bar, the flat metal bar is twisted to form a spiral. Also, the flat metal bar is affixed to the interior surface of the center portion of the discharge pressure manifold 130 at a midpoint between the two ends of the flat metal bar. That is, between the first end and the midpoint of the flat metal bar, the spiraling vane twists and extends at an angle from the air distribution tube 520a to the interior surface of the discharge pressure manifold 130; and between the midpoint and second end of the flat metal bar, the spiraling vane twists and further extends at an angle from the interior surface of the discharge pressure manifold 130 to the different affixation point on the air distribution tube 520a. In a similar manner, a spiraling vane can structurally support the air distribution tube 520b to securely hold it in place and to direct wastewater in the other half of the discharge pressure manifold 130.

An end portion of the discharge pressure manifold 130 includes a y-shaped pipe having one inlet that receives a stream of pressure-reduced wastewater from the center portion; and the end portion includes a pair of exits configured to forcibly discharge air-infused fluid downward toward the surface of the body of fluid in the tank 101. In certain embodiments, one or both of the end portions of the discharge pipe includes a shoe internally within, such as at the location of the y-shaped split. The shoe causes the spiraling water to encapsulate or surround the air that expels from the outlets of the air pipe assembly 160 at the longitudinal center of the spiral path of the wastewater.

As a particular example, the frame 150 includes an installation arm 170 that structurally connects a mounting bracket of the frame 150 to the industrial equipment associated with the tank 101. The installation arm 170 has an L-shape, wherein the short bend of the L-shaped bar is configured to vertically inserts through the mounting bracket of the frame 150.

The air infusion aeration system 100 provides increased aeration and mixing compared to turbine blowers having at least three times the horsepower in a wastewater treatment plant with a diffusion type aerator. The aeration system 100 removes a large amount of nitrogen and ammonia without using an anoxic mixer. The aeration system 100 reduces a large amount of sludge. This will reduce the amount sludge hauling and testing. The aeration system 100 reduces all odors. The aeration system 100 also eliminates the need to clean of the aeration basin. The aeration system 100 eliminates the need of diffusers and the piping associated with the diffusers in an aeration compartment of the tank 101. None of these have ever been accomplished in a wastewater treatment plant utilizing previous systems or technologies.

Although FIG. 1 illustrates one example air infusion aeration system 100, various changes may be made to FIG. 1. For example, the air infusion aeration system 100 could include a second discharge manifold at the first end of the aeration system, in which case the motor 110 could include a higher power rating, such as 50 horsepower.

Figure 2:
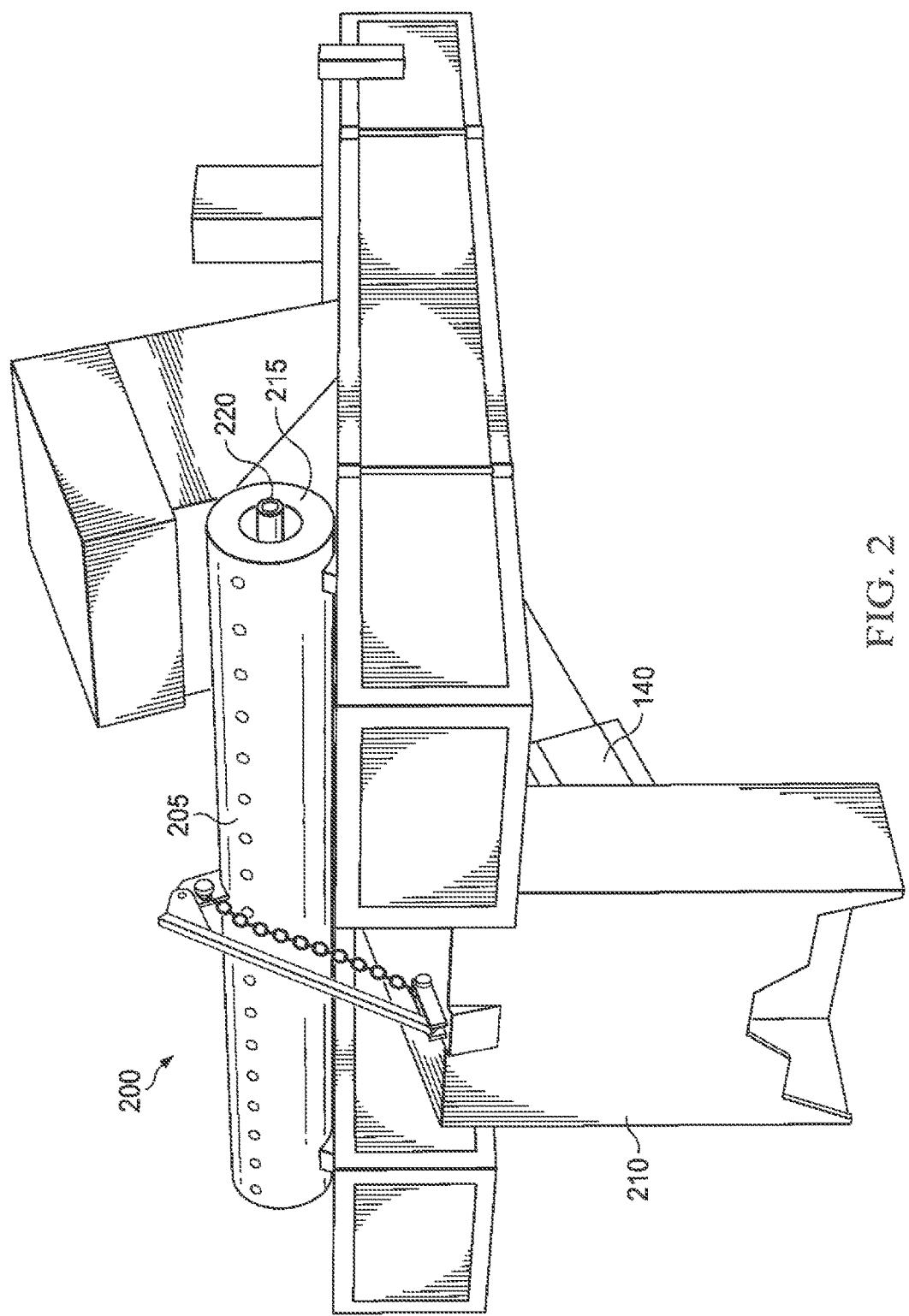
FIG. 2 illustrates components of an air infusion aeration system according to embodiments of the present disclosure.

FIG. 2 illustrates components of an air infusion aeration system 200 according to embodiments of the present disclosure. Note that while two air infusion aeration systems 100 and 200 are shown in the present disclosure, features of one air infusion aeration system could be used in the other air infusion aeration system. For instance, the air infusion aeration system 200 could include the end portions (reference numbers 610 and 615 shown in FIG. 6) of the discharge pipe of the discharge pressure manifold 130 mechanically fastened to the discharge pipe 205 of the air infusion aeration system 200. As another example, the air infusion aeration system 100 could include the upper member 210 of the downdraft tube shown in FIG. 2. Additionally, the center portion of the discharge pressure manifold 130 discharge pipe of the aeration system 100 could be the same as or similar to the discharge pipe 205 of the air infusion aeration system 200. As such, in certain embodiments, each end of the center portion of the discharge pressure manifold 130 includes an end 215 that provides a reduced diameter opening, for example, reduced from a ten inch outer diameter to a five and one-half inch inner diameter.

For ease of visibility, no discharge pipe end portions (reference numbers 610 and 615 shown in FIG. 6) are shown on the discharge pressure manifold 205, as such, the air distribution tube 220 is visible. The air distribution tube 220 and discharge pressure manifold 205 can share a same longitudinal center axis.

Figure 3:
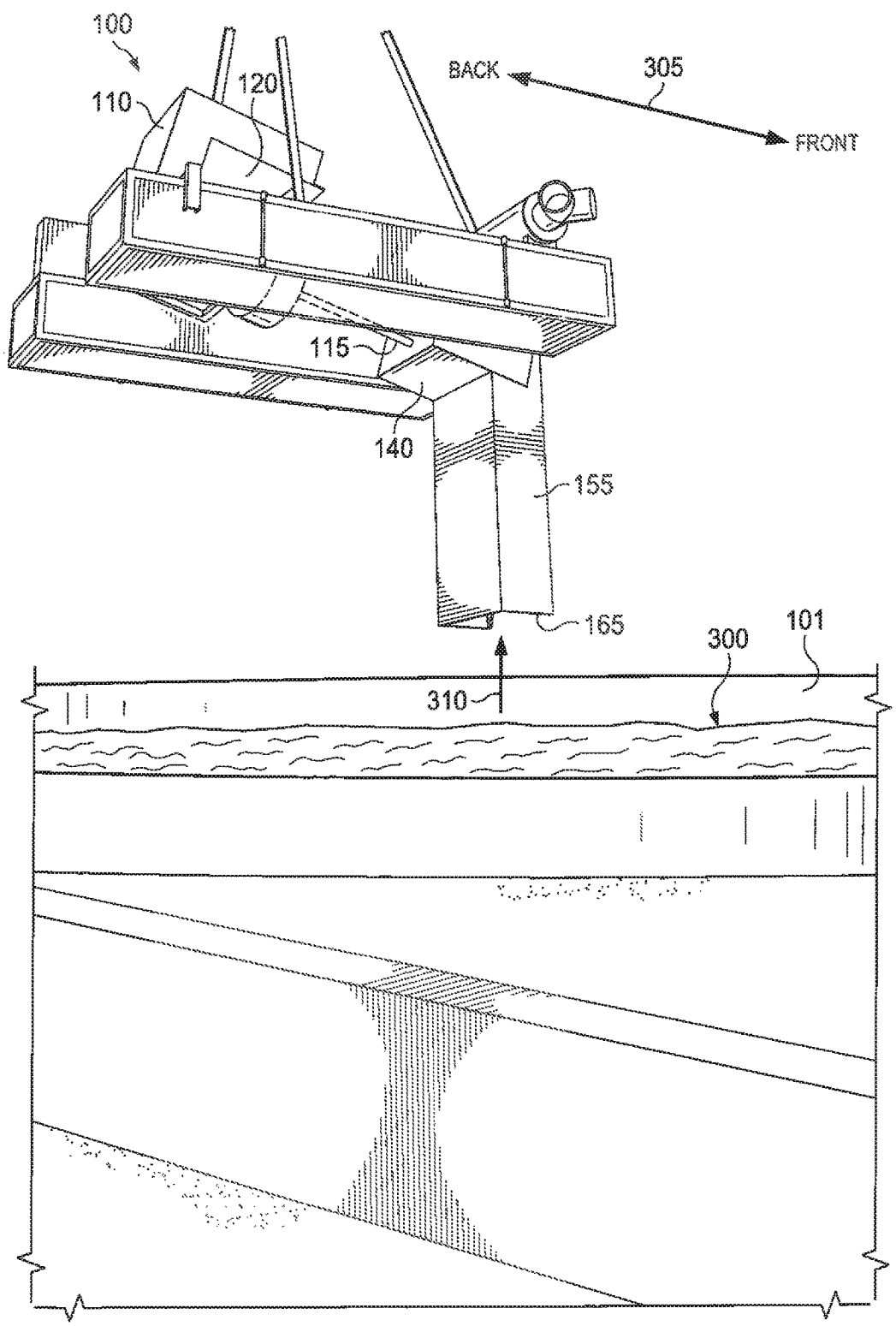
FIG. 3 illustrates the air infusion aeration system of FIG. 1.

FIG. 3 illustrates the air infusion aeration system 100 of FIG. 1 according to embodiments of the present disclosure. During installation, the aeration system 100 can be raised above the tank 101, such as by a crane, and then lowered onto the surface 300 of the body of fluid in the tank 101. In certain embodiments, the first and second ends of the aeration system 100 can be referred to as the back end and front ends of the aeration system 100, as indicated by the arrow 305. The arrow 310 indicates the direction of water intake into the downdraft tube 155 inlet opening 165.

Figure 4:
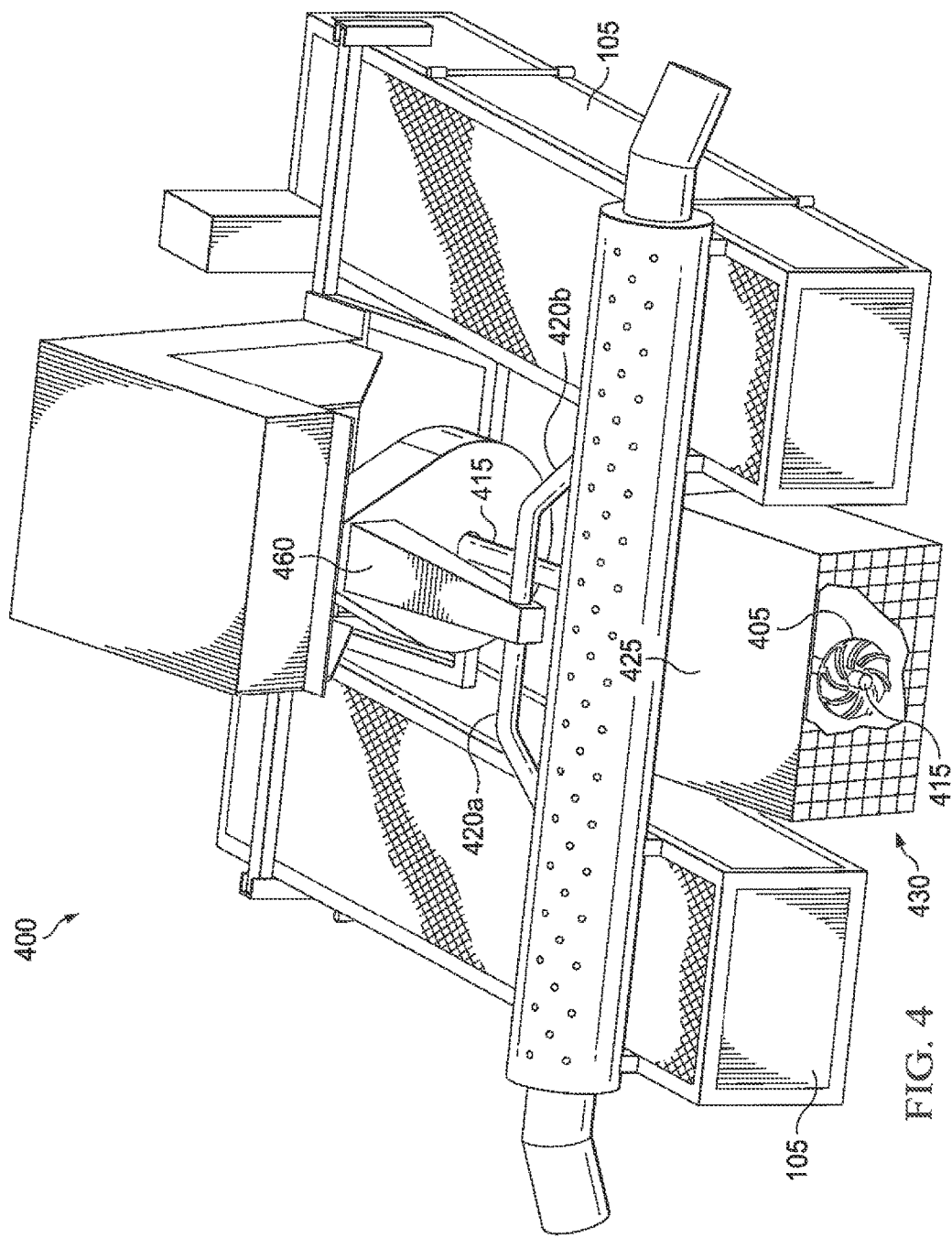
FIG. 4 illustrates a view of an aeration system for explaining an arrangement of the components of the air infusion aeration system according to embodiments of the present disclosure.

FIG. 4 illustrates a view of an aeration system 400 for explaining an arrangement of the components of the air infusion aeration system 100 according to embodiments of the present disclosure. For example, the single pump shaft 415, and pipe assembly 460, in FIG. 4 could be the same as or similar to corresponding single pump shaft 115, and pipe assembly 160 in FIG. 1; and the air distribution tube 220 in FIG. 2 could be the same as or similar to corresponding air distribution tubes 420a-420b in FIG. 4. That is, the tee split into air distribution tubes 420a-420b in FIG. 4 can be the same as or similar to the corresponding air distribution tubes within the air infusion aeration system 100 in FIG. 1.

As another example, the water pump impeller 405 in the aeration system 400 could be operate in a same or similar manner as the water pump impeller in the water pump 140 in the air infusion aeration system 100. That is, a motor rotates the shaft 415, which causes rotation of the water pump impeller 405 that is connected to the shaft 415. The water pump impeller 405 can include multiple blades within a housing or frame 425 of the water pump.

The aeration system 400 includes a filtration system 430. In certain embodiments, a filtration system 430 is disposed around the submersible water pump including the impeller 405. For example, the filtration system 430 may surround the submersible water pump. The filtration system 430 includes one or more of the following: a grating, a cage, a pipe filter, and or another suitable filter material. The filtration system 430 blocks, removes or otherwise inhibits a passage of large objects or particles from flowing into the water pump impeller 405. The filtration system 430 of FIG. 4 can be included in the air infusion aeration system 100 of FIG. 1, and various changes can be made to the filtration system 430, for example, the grating, cage, pipe filter, or other suitable filter material can cover the inlet opening 165 of the downdraft tube 155 to inhibit a passage of large objects or particles from flowing into the water pump 140.

Figure 5:
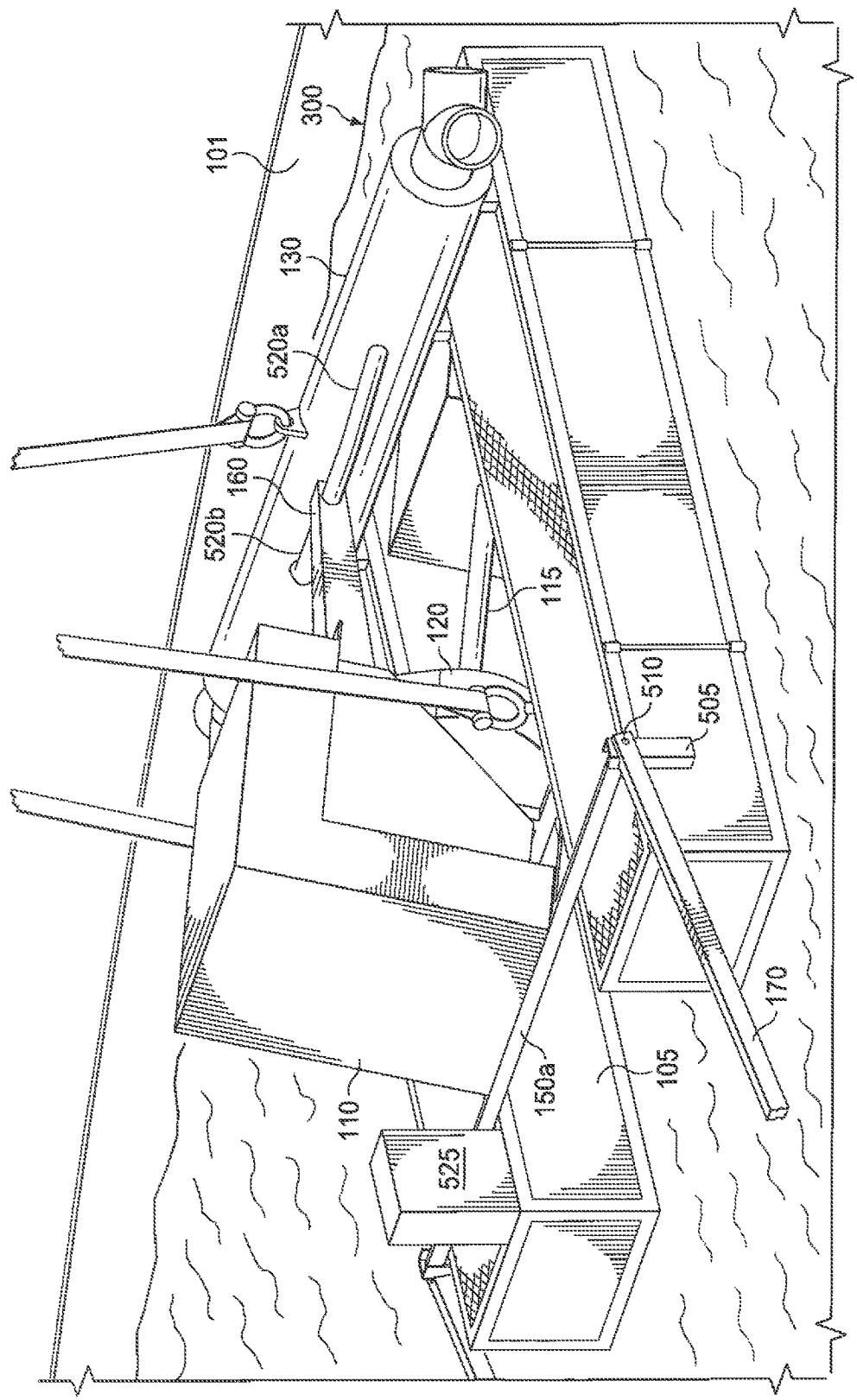
FIG. 5 illustrates an example of placement of the air infusion aeration system of FIG. 1 into the waste water treatment tank according to embodiments of the present disclosure.

FIG. 5 illustrates an example of placement of air infusion aeration system 100 of FIG. 1 into the waste water treatment tank 101 according to embodiments of the present disclosure. The example shown in FIG. 5 is for illustration only and the aeration system 100 can be disposed or place in any suitable manner.

The frame 150 of the aeration system 100 includes a support beam 150*a* holds the floats 105 together, and includes a mounting bracket 505 configured to receive the installation arm 170 vertically through the mounting bracket. The mounting bracket 505 can be affixed to the outside of the float 105. The installation arm 170 includes a rectangular metal bar that connects the mounting bracket 505 to the tank 101, so that the aeration system 100 remains in a fixed location relative to the diameter of the tank 101. At the same time, the installation arm 170 enables the aeration system 100 to rise and fall with the surface of the waste. For example, the installation arm 170 can include long bar jointed to the mounting bracket via a hinge 510 that, according to the vertical movement of the floating aeration system 100, varies the angle between the long straight portion of the L-shaped bar and short bend portion of the L-shaped bar within mounting bracket.

The point of view in FIG. 5 shows that the air pipe assembly 160 tee splits into air distribution tubes 520*a* (shown) and 520*b* (blocked from the shown point view) within the air infusion aeration system 100. Note that the air distribution tubes 520*a*-520*b* can be the same as or similar to the air distribution tubes 220 in FIG. 2 or air distribution tubes 420*a*-520*b* in FIG. 4.

The air infusion aeration system 100 includes a power junction box 525, which includes terminals configured to electrically connect to a power source in order to receive electricity to operate the electrically-operated components of the aeration system 100. Junction cables can carry electricity from the power source to the power junction box 525. For example, the motor 110 operates using electric power received through the power junction box 525.

Figure 6:
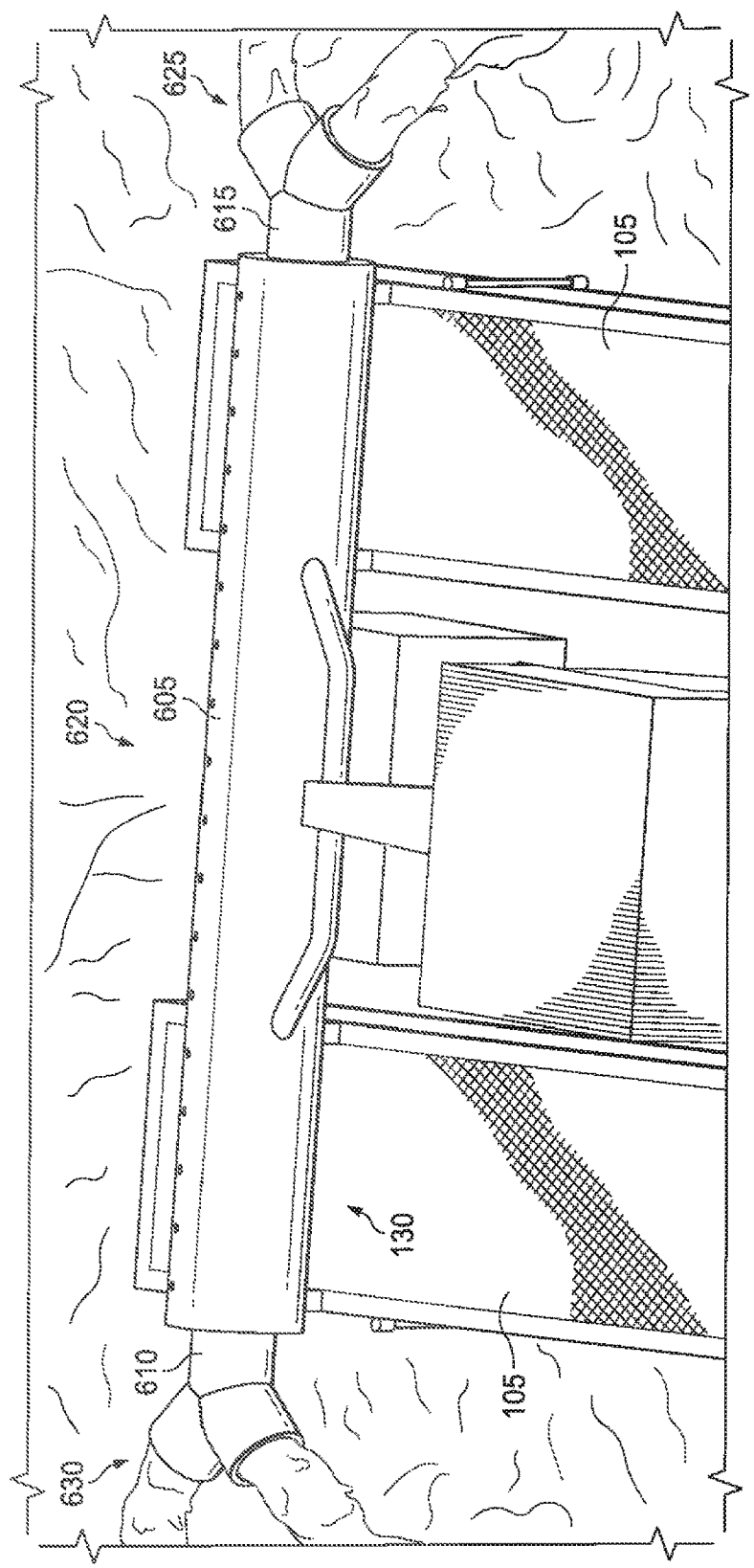
FIG. 6 illustrates an alternative view of the air infusion aeration system of FIG. 1 during operation within the waste water treatment tank according to embodiments of the present disclosure.

FIG. 6 illustrates an alternative view of the air infusion aeration system 100 of FIG. 1 during operation within the waste water treatment tank 101 according to embodiments of the present disclosure.

The discharge pressure manifold 130 is shown in greater detail. As described above, the discharge pipe includes a center portion 605 extending approximately the outer width between the floats 105. The discharge pipe includes two end portions 610 and 615, each end portion extending out from an end of the center portion. The diameter of the center portion 605 is larger than the diameter of the diameter of the end portions 610, 615. For example, in a particular embodiment, the center portion 605 of the discharge pipe includes a diameter that is approximately 10 inches, and each of the reduced diameter end portions 610, 615 include a diameter that that is approximately 6 inches. The water pump impeller 405 is disposed between the downdraft tube 155 and the header or center portion 605 of the discharge pressure manifold 130.

During operation of the air infusion aeration system 100, the surface 300 of the body of fluid includes a front area 620 in front of the center portion, which is an area that includes noticeably less turbulence than the side areas 625, 630 below and straight out from the exits of the end portions 610 and 615.

FIGS. 7, 8, 9A, and 9B illustrate various example pipe hoods 700, 800, 900 of the air infusion aeration system 100 of FIG. 1 according to embodiments of the present disclosure. Each pipe hood 700, 800, 900 directs exiting wastewater vertically down toward the surface 300 of the body of fluid, and block the exiting wastewater from spraying up.

Figure 7:
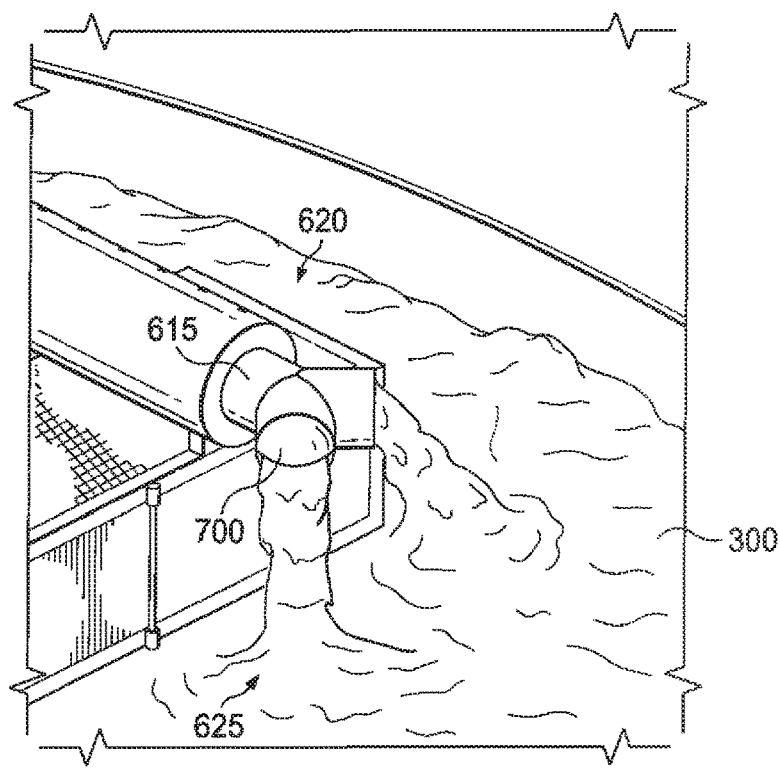
FIGS. 7, 8, 9A, and 9B illustrate various example pipe hoods of the air infusion aeration system of FIG. 1 according to embodiments of the present disclosure.

As shown in FIG. 7, a pipe hood 700 include a rigid flap mounted to the top portion of the exit of the end portion 615. The pipe hood 700 extends outward from the exit at a downward slant toward the surface 300 of the body of fluid. The pipe hood 700 can be formed of a stainless steel.

Figure 8:
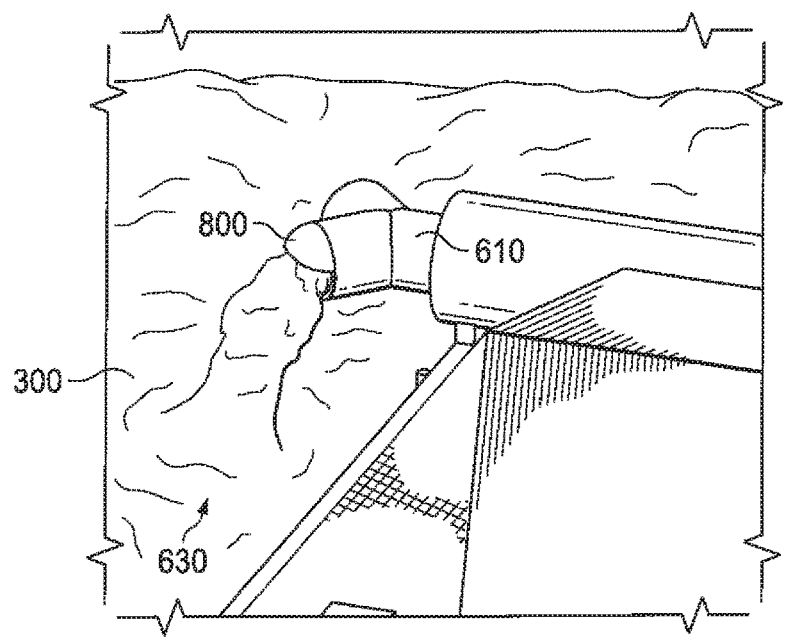

As shown in FIG. 8, a pipe hood 800 includes a rigid metal material that is mounted to the top and sides of the exit of the end portion 610. The pipe hood 800 can be in the shape of a half pyramid. The sides of the pipe hood 800 additionally blocks the wastewater exiting at the top of the end portion 610 from spraying sideways.

Figure 9A:
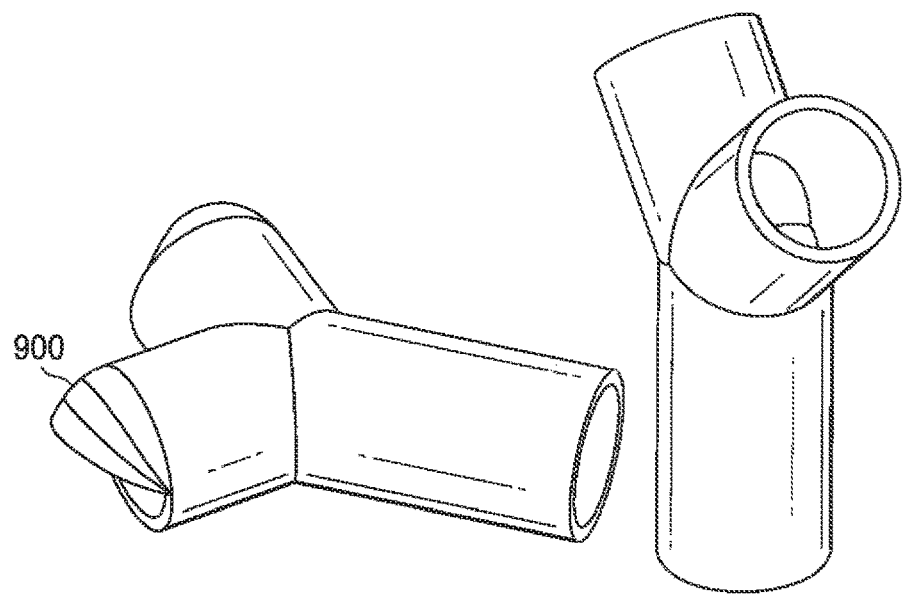
Figure 9B:
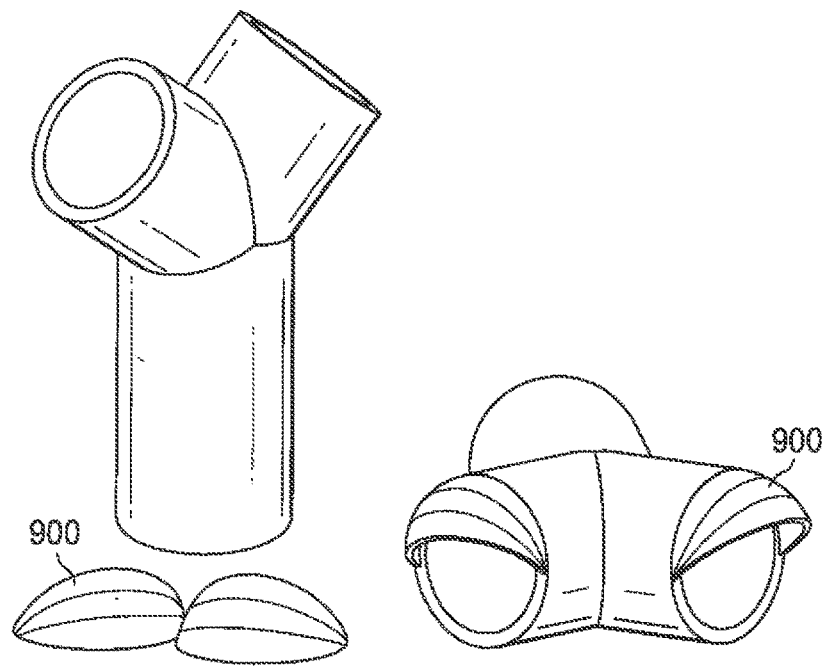

As shown in FIGS. 9A and 9B, a pipe hood 900 includes a rigid metal arch. The pipe hood 900 formed as a permanent portion of the discharge pressure manifold 130. For example, the pipe hood 900 can be welded along the perimeter of the upper half of both exits of each end portion 610, 615. The sides of the pipe hood 900 additionally blocks the wastewater exiting at the top half of the end portion 610 from spraying sideways.

Figure 10:
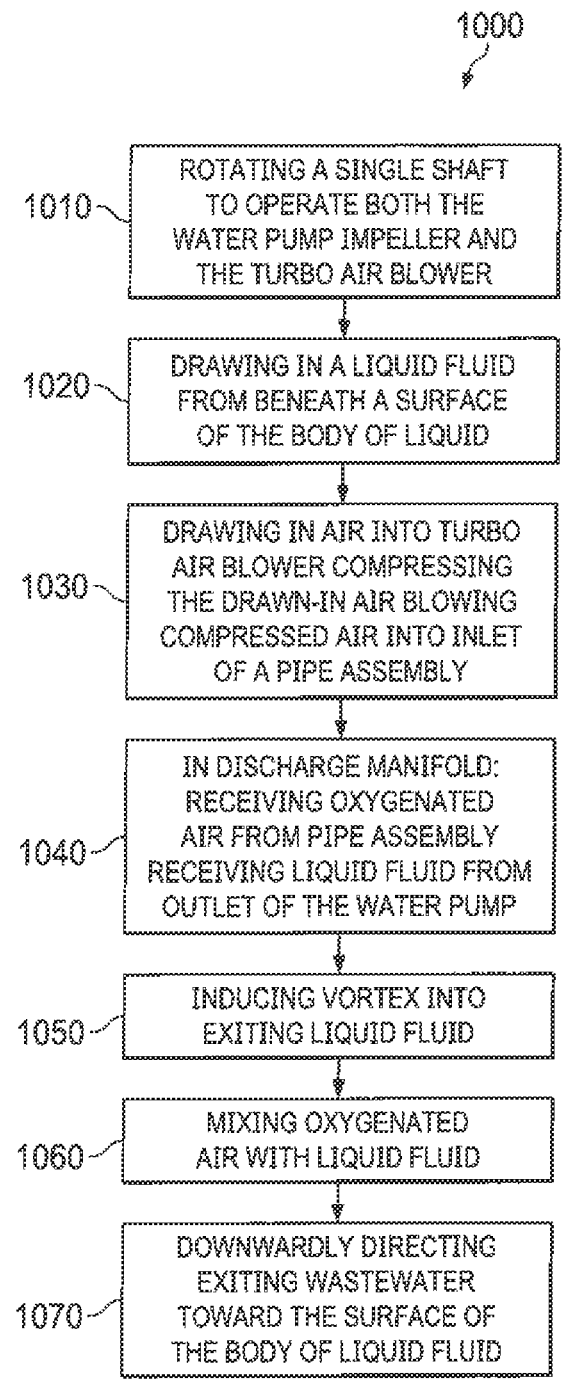
FIG. 10 illustrates a method of aerating a body of fluid by air infusion according to embodiments of the present disclosure.

FIG. 10 illustrates a method 1000 of aerating a body of fluid by air infusion according to embodiments of the present disclosure. The air infusion aeration system 100 is configured to implement the method 1000. The embodiment of the method 1000 shown in FIG. 10 is for illustration only. Other embodiments could be used without departing from the scope of this disclosure.

The aeration system 100 prior to installing the air infusion aeration system 100 in a body of fluid, the downdraft tube 155 is connected to the housing or frame 425 of the water pump 140. In the case of the multi-piece type downdraft tube 155, the lower member attaches to the upper member. In the case of a single piece type downdraft tube, the outlet opening of the downdraft tube is attached to the housing or frame 425 of the water pump 140. The aeration system 100 is installed prior to performing the method 100. In order to install the aeration system 100, the aeration system 100 is put or otherwise lowered (for example, by a crane) into a body of fluid such that the floats 105 maintain the non-submersible components above the surface 300 of the body of fluid, while allowing the other components to submerge. Also during installation, the power junction box 525 is connected to a power source.

In block 1010, the motor 110 rotates the single shaft 115 to operate both the impeller of the water pump 140 and the turbo blower 120. Additionally, the air pump 125 operates when the motor 110 operates, such that the air pump 125 outputs sufficient air flow to the turbo blower 120.

In block 1020, the downdraft tube 155 receives fluid through its inlet opening 165. For example, the impeller of the water pump 140 draws in fluid from beneath the surface 300 of the body of fluid by pumping fluid from the inlet opening to the header of the water pump 140, vertically up through the downdraft tube 155.

In block 1030, the turbo blower 120 draws in air. For example, the turbo blower 120 draws in oxygenated air through a rear air intake of the housing of the turbo blower. The turbo blower 120 compresses the in-taken air, and blows the compressed air through a front of the turbo blower 120, thereby outputting oxygenated compressed air into an inlet of the pipe assembly 160. Note that the operations in blocks 1020 and 1030 do not occur in a particular order and can occur at the same time.

In block 1040, the discharge pressure manifold 130 receives compressed oxygenated air from the pipe assembly 160 and receives wastewater from the water pump 140. More particularly, the pipe assembly 160 conveys the compressed air to two outlets, each at the end of a respective air distribution tube 520a, 520b on opposite halves of the discharge pressure manifold 130. That is, the air pipe assembly 160 conveys the compressed oxygenated air through a trapezoidal, tapered pipe member to the tee split that redirects the air into the air distribution tubes 520a-520b, which expel the air into the each of the two end portions 610 and 615. The velocity of the expelled through the two outlets is higher than the velocity of the air received through the inlet of the pipe assembly 160.

In block 1050, the discharge pressure manifold 130 induces a vortex into exiting wastewater. That is, inside the discharge pressure manifold 130, spiraling vanes at the diameter reduction of the discharge pressure manifold 130 guide the flow direction of the wastewater into a spiral path, inducing the vortex into the exiting wastewater exiting the two exits of end portion 610 and exiting the two exits of end portion 615. This vortex induction at the center of the discharge pipe reduces the pressure at the center of the discharge pipe, creating a negative pressure zone.

In block 1060, the received wastewater mixes with the received oxygenated air within the discharge pressure manifold 130. More particularly, within each end portion 610 and 615, the increased velocity air expelled from the air distribution tubes 520a-520b mixes with the spiraling wastewater. For example, the air distribution tubes 520a-520b expel the increased velocity air into the negative pressure zone proximate the vortex. As described above with reference to FIG. 1, the negative pressure zone significantly lowers the head from the turbo blower 120 and significantly increases the amount of air the wastewater can infuse. The discharge of the wastewater at the two sides of the discharge pressure manifold 130 creates a zone of high shear and increase the air velocity at the surface of the water droplets discharged through the exits of the end portions 610 and 615. This zone of high shear disrupts the molecular structural composition of the wastewater and infuses the oxygenated air into the wastewater. This creates a non-equilibrium flash point process that can remove nitrogen and ammonia from the wastewater.

In block 1070, the discharge the pipe hoods 700, 800, 900 direct the discharged wastewater downwardly toward the surface 300 of the body of fluid into areas 625, 630 at the sides of aeration system 100. That is, the air infused wastewater exits the end portions 610 and 615 of the discharge pressure manifold 130 into areas 625, 630 at the sides of aeration system 100. By blocking the air-infused wastewater from spraying up and from spraying out sideways, the pipe hoods 700, 800, 900 increases the amount of air-infused wastewater that returns to the tank 101, as opposed to being lost due to spraying out of the tank.

Although various features have been shown in the figures and described above, various changes may be made to the figures. For example, the size, shape, arrangement, and layout of components shown in FIGS. 1 through 9B are for illustration only. Each component could have any suitable size, shape, and dimensions, and multiple components could have any suitable arrangement and layout. Also, various components in FIGS. 1 through 9B could be combined, further subdivided, or omitted and additional components could be added according to particular needs. Further, each component in a device or system could be implemented using any suitable structure(s) for performing the described function(s). In addition, while FIG. 10 illustrates various series of steps that could overlap, occur in parallel, occur multiple times, or occur in a different order.

Although embodiments of the present disclosure have been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. A system for aerating a body of fluid that includes water, the system comprising:
   a downdraft tube including an inlet opening and an outlet opening, the outlet opening being vertically above the inlet opening; the downdraft tube configured to submerge below a surface of the body of fluid and carry fluid from the inlet opening to the outlet opening;
   a water pump impeller coupled to the outlet opening and configured to draw fluid into the inlet opening and provide the drawn fluid as an input fluid stream into a discharge pressure manifold;
   a turbo blower configured to inject air into the discharge pressure manifold; and
   the discharge pressure manifold coupled to the turbo blower and including a center portion and end portions at opposite ends of the center portion, the center portion having a larger diameter than the end portions, the discharge pressure manifold configured to:
     reduce pressure of fluid streams at a center of each of the discharge pressure manifold end portions, and
     within each of the end portions, receive the injected air into a center of the pressure-reduced fluid streams to produce a high shear zone with the fluid streams and to infuse the injected air into the fluid streams to also initiate a non-equilibrium flash point process that removes nitrogen and ammonia from the fluid; and
   wherein each of the end portions includes a y-shaped pipe comprising:
     one inlet configured to receive the pressure-reduced fluid stream from the center portion, and a pair of exits configured forcibly discharge the air-infused fluid stream down toward the body of fluid.

2. The system of claim 1, wherein the pair of exits include a pair of pipe hoods configured to direct a flow path of the forcibly discharged air-infused fluid stream down toward the body of fluid, and to block the forcibly discharged air-infused fluid stream from spraying up.

3. The system of claim 1, wherein the inlet opening is disposed vertically below the outlet opening by a length of the downdraft tube in a range between 8 feet and 10 feet.

4. The system of claim 1, wherein the discharge pressure manifold further comprises vanes in the center portion, the vanes are configured to further reduce pressure of the fluid stream at the center of the end portions of the discharge pressure manifold by directing each of the fluid streams into a spiral flow path inducing a vortex.

5. The system of claim 1, wherein the turbo blower is configured to inject the air into the discharge pressure manifold via an air pipe assembly coupled between the turbo blower and the discharge pressure manifold;
the system further comprising the air pipe assembly configured to carry and increase a velocity of the air received from the turbo blower to the center of the discharge pressure manifold within the end portions.

6. An apparatus for aerating a body of fluid that includes water, the apparatus comprising:
a motor configured to drive a water pump impeller and a turbo blower via a single shaft;
a downdraft tube including an inlet opening and an outlet opening, the outlet opening being vertically above the inlet opening, the downdraft tube configured to submerge below a surface of the body of fluid and carry fluid from the inlet opening to the outlet opening;
the water pump impeller coupled to the outlet opening and configured to draw fluid into the inlet opening and provide the drawn fluid as an input fluid stream into a discharge pressure manifold;
the turbo blower configured to inject air into the discharge pressure manifold; and
the discharge pressure manifold coupled to the turbo blower and including a center portion and end portions at opposite ends of the center portion, the center portion having a larger diameter than the end portions, the discharge pressure manifold configured to:
reduce pressure of fluid streams at a center of each of the discharge pressure manifold end portions, and
within each of the end portions, receive the injected air into a center of the pressure-reduced fluid streams to produce a high shear zone with the fluid streams and to infuse the injected air into the fluid stream to also initiate a non-equilibrium flash point process that removes nitrogen and ammonia from the fluid; and
wherein each of the end portions includes a y-shaped pipe comprising:
one inlet configured to receive the pressure-reduced fluid stream from the center portion; and
a pair of exits configured to forcibly discharge the air-infused fluid stream down toward the body of fluid.

7. The apparatus of claim 6, wherein the pair of exits include a pair of pipe hoods configured to direct a flow path of the forcibly discharged air-infused fluid stream down toward the body of fluid, and to block the forcibly discharged air-infused fluid stream from spraying up.

8. The apparatus of claim 6, wherein the inlet opening is disposed vertically below the outlet opening by a length of the downdraft tube in a range between 8 feet and 10 feet.

9. The apparatus of claim 6, wherein the discharge pressure manifold further comprises vanes in the center portion, the vanes are configured to further reduce pressure of the fluid stream at the center of the ends of the discharge pressure manifold by directing each of the fluid streams into a spiral flow path inducing a vortex.

10. The apparatus of claim 6, wherein the turbo blower is configured to inject the air into the discharge pressure manifold via an air pipe assembly coupled between the turbo blower and the discharge pressure manifold;
the apparatus further comprising the air pipe assembly configured to carry and increase a velocity of the air received from the turbo blower to the center of the discharge pressure manifold within the end portions.

11. The apparatus of claim 6, further comprising a floatation support configured to maintain at least the motor and the turbo blower of the apparatus above a surface of the body of fluid.

12. A method for aerating a body of fluid that includes water, the method performed by an air-infusion aeration system that includes a downdraft tube submerged below a surface of the body of fluid, wherein the downdraft tube includes an inlet opening and an outlet opening, the outlet opening being vertically above the inlet opening, the method comprising:
drawing, by a water pump impeller coupled to the outlet opening, fluid into the inlet opening;
carrying, by the downdraft tube, the drawn fluid from inlet opening to the outlet opening;
providing, by the water pump impeller, the drawn fluid into a discharge pressure manifold as an input fluid stream;
injecting, by a turbo blower, air into the discharge pressure manifold, the discharge pressure manifold coupled to the turbo blower and including a center portion and end portions at opposite ends of the center portion, the center portion having a larger diameter than the end portions;
reducing, by the discharge pressure manifold, pressure of fluid streams at a center of each of the discharge pressure manifold end portions;
within each of the end portions, receiving the injected air into a center of the pressure-reduced fluid streams, producing a high shear zone with the fluid streams, and infusing the injected air into the fluid streams initiating a non-equilibrium flash point process that removes nitrogen and ammonia from the fluid; and
each end portion includes a y-shaped pipe having one inlet and a pair of exits, wherein the method further comprises:
receiving, by the inlet of the y-shaped pipe, the pressure-reduced fluid stream from the center portion, and
forcibly discharging, by the pair of exits of the y-shaped pipe, the air-infused fluid streams down toward the body of fluid.

13. The method of claim 12, further comprising:
directing, by a pair of pipe hoods of the pair of exits, a flow path of the forcibly discharged air-infused fluid stream down toward the body of fluid, and
blocking, by the pair of pipe hoods, the forcibly discharged air-infused fluid stream from spraying up.

14. The method of claim 12, further comprising:
further reducing, by vanes in the center portion of the ends of the discharge pressure manifold, pressure of the fluid stream at the center of the discharge pressure manifold by directing each of the fluid streams into a spiral flow path inducing a vortex; and
wherein producing the non-equilibrium comprises producing a non-equilibrium flash point that disrupts a molecular composition of the fluid, and
further infusing the injected air into the pressure-reduced fluid steam proximate the vortex.

15. The method of claim 12, wherein injecting air into the discharge pressure manifold comprises:
injecting, by the turbo blower, the air into the discharge pressure manifold via an air pipe assembly coupled between the turbo blower and the discharge pressure manifold,
wherein the air-infusion aeration system further includes the air pipe assembly configured to carry and increase a velocity of the air received from the turbo blower to the center of the discharge pressure manifold within the end portions.

* * * * *